Jan. 26, 1954

R. T. CLOUD 2,666,992

ELEVATION METER

Filed June 7, 1948

RAYMOND T. CLOUD
Inventor

By J. Vincent Martin
Ralph R. Browning
James B. Simms
Attorneys

Jan. 26, 1954

R. T. CLOUD 2,666,992

ELEVATION METER

Filed June 7, 1948

RAYMOND T. CLOUD
Inventor

J. Vincent Martin
Ralph R. Browning
James B. Simms

By

Attorneys

Jan. 26, 1954
R. T. CLOUD
2,666,992
ELEVATION METER
Filed June 7, 1948
4 Sheets-Sheet 3
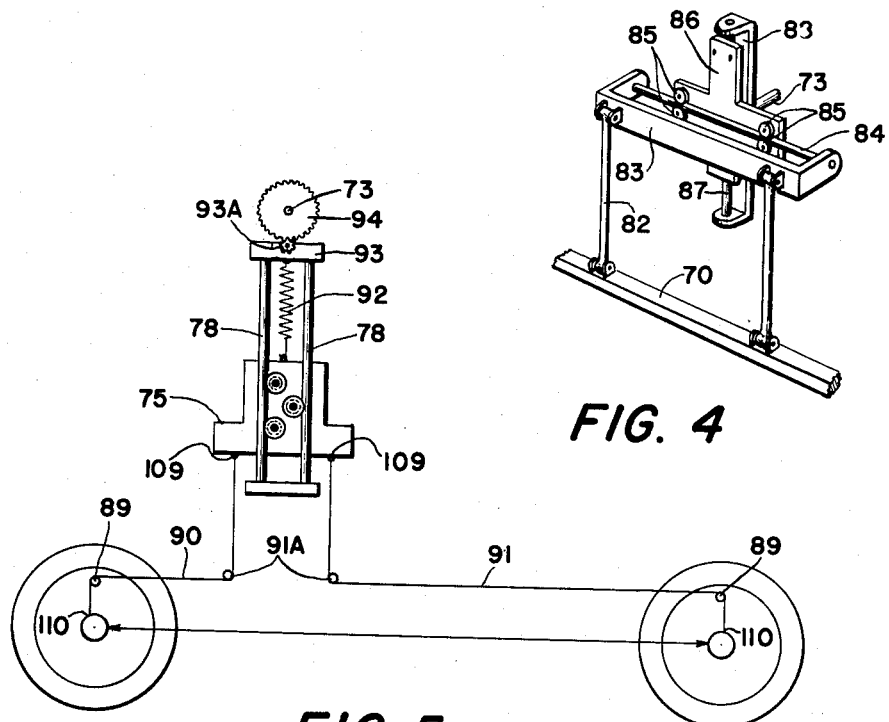
FIG. 4
FIG. 5
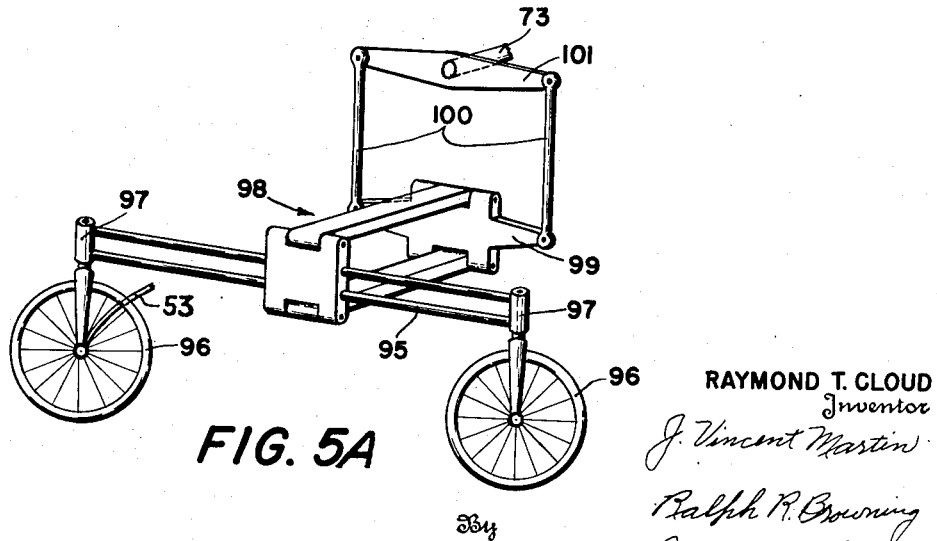
FIG. 5A
RAYMOND T. CLOUD
Inventor
J. Vincent Martin
Ralph R. Browning
James B. Simms
Attorneys Jan. 26, 1954  R. T. CLOUD  2,666,992
ELEVATION METER Filed June 7, 1948  4 Sheets-Sheet 4

RAYMOND T. CLOUD
INVENTOR.

BY J. Vincent Martin
Ralph R. Browning
James B. Simms
ATTORNEY

Patented Jan. 26, 1954

2,666,992

UNITED STATES PATENT OFFICE 2,666,992

ELEVATION METER

Raymond T. Cloud, Houston, Tex., assignor to North American Geophysical Co., Houston, Tex., a corporation of Texas Application June 7, 1948, Serial No. 31,449

2 Claims. (Cl. 33—141.5)

This invention relates to improvements in surveying instruments and refers more particularly to apparatus for determining differential elevations between points on the earth's surface traversed by a vehicle.

This application is a continuation in part of the application for United States Letters Patent filed September 13, 1946, Serial No. 696,739, which became Patent No. 2,598,355, issued May 27, 1952.

The fundamental principle involved is that of measuring the distance traversed by means of an odometer, which may be attached to a wheel of the vehicle, and the instantaneous angle of the vehicle relative to the horizontal. This latter is accomplished by means of a pendulum under the influence of gravity. The difference in elevation is then:

$$E = k = \int_{s^0}^{s^1} \sin \phi \, ds$$

where:

$E$ = difference in elevation
$k$ = constant of apparatus
$\phi$ = angle of terrain
$s$ = distance traversed
$s^0$ = initial point of vehicle
$s^1$ = final vehicle position Heretofore apparatus for accomplishing this has not been entirely satisfactory. No difficulty has been encountered in the measurement of distance. However, the measure of the instantaneous angle of the vehicle with the accuracy necessary to provide a device having an accuracy of plus or minus six inches (6") to the mile has presented difficulties not heretofore satisfactorily solved. To provide a suitable mechanism of the type employing a pendulum to measure the angle, the measurement of the angle must be with an accuracy in the neighborhood of one-third of a degree or twenty seconds.

Some of the features which contribute to the difficulties involved in the measurement of the angle, when the apparatus is mounted on the floor of an ordinary spring suspended car body are enumerated below:

1. The solid friction of the pendulum's bearings may cause the pendulum to deviate from a true perpendicular position.
2. The spring suspension of the car body changes and introduces an error into the apparatus as the angle of the body relative to the horizontal does not represent the true angle of the roadway. The position of the spring mounted chassis of the vehicle is influenced by:

(a) Detention by friction of leaf springs or shock absorbers;
(b) Unequal distribution of the vehicle load due to the shift of driver's position, extra passengers, or other articles placed on or removed from the car, as well as the difference in the weight of gasoline carried in the car tank;
(c) The effect of wind on the car body.

It is the general object of the present invention to eliminate the difficulties heretofore encountered and to this end there is provided a novel apparatus which will be explained in the following description and includes different embodiments suitable for carrying the invention into effect.

More specifically, an object of the invention is to provide a suitable pendulum in the form of a disc having unsymmetrical cut-away portions.

Another object is to provide a mounting for the pendulum such that the pendulum is free to hang true to the perpendicular as the angle of inclination of the vehicle varies.

A further object is to provide means for rotating the support from which the pendulum is suspended, about an axis aligned with the pendulum suspension, the rotation being relative to the vehicle and in substantial unison with the pendulum.

Still another object is to provide a pendulum support which is rotatable in unison with the pendulum wherein the support carries a means for imposing a magnetic flux about the pendulum ring to retard vibration and oscillation of the pendulum.

Still a further object is to provide apparatus of the character described which may have a spring mounting on a vehicle and means for compensating for the angle between the unsprung vehicle chassis and the cushion mounting.

Yet another object is to provide apparatus of the character described which may have a spring mounting on a vehicle and means for measuring the true angle between the pendulum and a reference line determined by two points having a position at a constant distance above the roadway.

Yet a further object is to provide in an elevation meter having a cushioned mounting upon a vehicle, a means for introducing into the integrator the angular variation between the horizontal reference means of the instrument and a line determined by two points positioned at a constant distance above a roadway without transmitting therebetween the shock and translatory movement of the reference line.

Other and further objects will appear from the following description:

In the accompanying drawings, which form a part of the instant specification, are to be read in conjunction therewith and wherein like reference numerals are used to indicate like parts in the various views:

Fig. 4 is a schematic view of a modified apparatus for transmitting to the integrator of the apparatus shown in Fig. 1 the angular variation between a reference line having an invariable position relative to a roadway and the cushioned mounting of the instrument;

Fig. 5 is a schematic view of still another apparatus for transmitting to the integrator of the device shown in Fig. 1 the angular variations between the spring mounted frame of the instrument and the roadway;

Fig. 5A is a still further modification of apparatus similar to that shown in Figs. 4 and 5;

Figure 1:
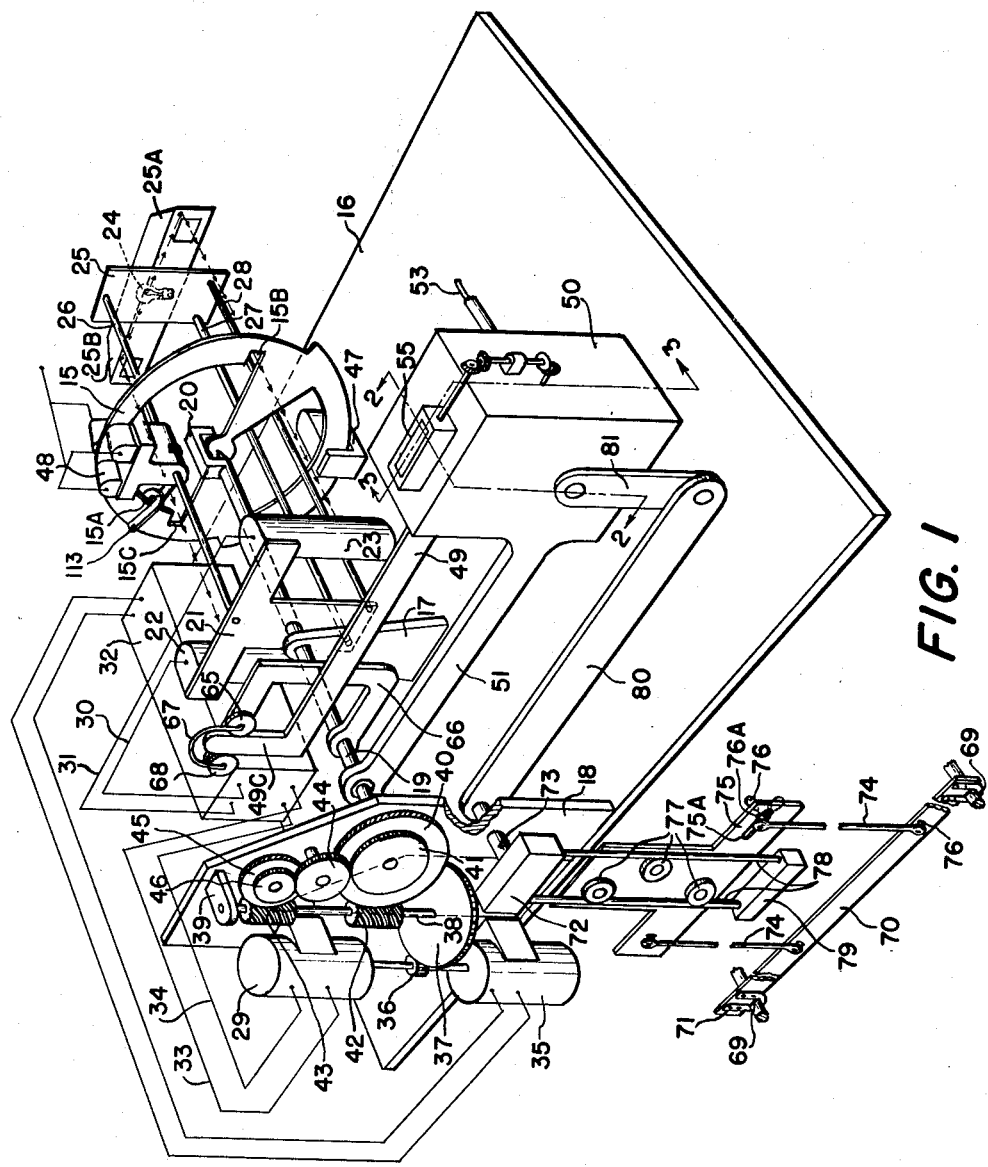
Fig. 1 is a diagrammatical perspective view of apparatus constituting an embodiment of this invention.

In the description of the apparatus of this invention Fig. 1 will be first referred to. The apparatus may be considered as comprised of the following component parts:

The pendulum and follow up support from which the pendulum is suspended with the means for rotating the follow-up support in unison with the pendulum;

Mechanism for adding to the angle between the frame of the instrument and the pendulum the angle between the frame of the instrument and two points which are spaced apart and reside in a plane parallel to the direction of travel of the vehicle and are positioned at a constant distance above the roadway;

The sine converter and integration mechanism whereby the summation between selected limits of the route traversed by the vehicle of the sine of the angle between the horizontal reference coordinate provided by the pendulum and a reference line invariably positioned relative to the roadway times the differential of the distance traveled by the vehicle between the limits.

Pendulum and follow-up system

In the apparatus of this invention pendulum 15 may be considered as the real heart of the instrument and is adapted to remain in a vertical position whereby the center of mass remains directly below the center of suspension at all times, thus, the vertical acceleration imposed by the car's up and down motions produce no turning moment about the axis of the pendulum. This may be accomplished by mounting the pendulum upon a follow-up support which is rotatably mounted.

The axis of rotation of the follow-up support and the axis of oscillation of the pendulum must be in alignment. This mounting is essential to proper functioning of the device. By this expedient the torsion wires or the ball bearings which may be used to suspend the pendulum are subjected merely to the instantaneous deviation of the pendulum from the folow-up support. On the other hand, if the pendulum were suspended from the main frame of the device, this deviation usually would be much greater, as it would be the angle of deviation between the pendulum and the vehicle. Inasmuch as the follow-up support moves in substantial unison with the pendulum, the torsion developed in the wire or the friction of the ball bearings, as the case may be, is substantially eliminated. When ball bearings are used, the proper relation of the inner and outer races to each other is assured substantially eliminating friction whereby the vertical position of the pendulum may be maintained. In a torsion wire suspension, the residual torsion in the wire would cause a deviation of the pendulum from the vertical.

Figure 7:
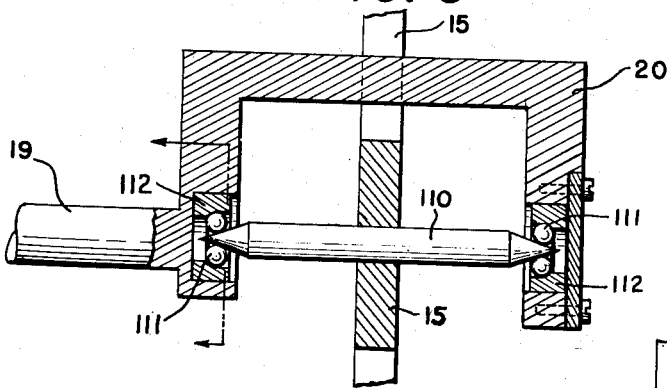
Fig. 7 is a view on an enlarged scale showing the mounting for the pendulum shown in Fig. 1.
Figure 8:
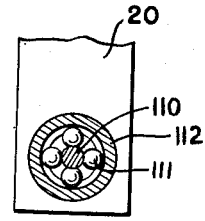
Fig. 8 is a view taken along the line 8—8 in Fig. 7 in the direction of the arrows.

Preferably the follow-up system and pendulum are carried by a support or frame 16. Frame has two upright portions 17 and 18 in which shaft 19 is journaled. Shaft 19 serves as the axis of the follow-up system and carries at its right hand extremity a bracket 20 to which the pendulum 15 has a suitable pivotal mounting provided either by torsion wire or substantially frictionless ball bearings. The pivotal ball bearing mounting is preferred and is detailed in Figs. 7 and 8. The pivot pin 110 extends through the central portion of pendulum 15 and is rigidly secured thereto. The pin 110 has conical ends, preferably surface hardened. These pointed ends are journaled in bracket 20 and engage ball bearings 111 secured in races 112 recessed in the bracket.

Shaft 19 serves as a follow-up support and carries the photo-electric system to provide the energy for effecting rotation of shaft 19 in substantial unison with any angular deviation between the shaft and the pendulum.

The photo-electric system includes a bracket 21 rigidly interconnected to shaft 19 which supports photo-electric cells 22 and 23. These cells are adapted to receive light from lamp 24 carried in a housing 25 supported from bracket 21 by arms 26, 27 and 28. Housing 25 has two reflecting surfaces 25A and 25B which reflect light from the lamp through windows provided in the face of the housing. Pendulum 15 resides intermediate housing 25 and the photocells 22 and 23 and provides the shutter for distributing light in a predetermined manner to the photocells. In order to provide this shutter effect, the pendulum is in the shape of an unsymmetrical disk having a cutaway portion 15A in its upper portion through which support arm 26 passes. Adjacent the outer edge of the disk cutaway 15A has two radial extensions 15B and 15C through which the light may pass from the windows in housing 25 to the photoelectric cells as indicated by the arrows in the drawing. The arrangement is such that the light provides a balanced energy in cells 22 and 23 when the pendulum and photocells are in a predetermined angular relationship. However, when the pendulum tends to revolve about its axis relative to the axis of the follow-up support an unbalanced electrical energy is developed by the two photocells and this energy is utilized to control a means for turning the follow-up shaft.

The means for varying the angular disposition of the follow-up support relative to the frame of the instrument in substantial unison with the angular variation between the pendulum and the frame includes a servomotor 29 adapted to be actuated in response to the energy generated in the photoelectric cells and having a suitable gear connection with shaft 19. Conductors 30, and 31 are electrically connected between photocells 22 and 23 respectively and an amplifier shown diagrammatically at 32. The amplifier is supported upon frame 16 and the output of the amplifier is electrically connected by leads 33 and 34 with servomotor 29. The servomotor may be suitably mounted upon upright support 18 of the frame and preferably a suitable damper shown schematically at 35 and energized by suitable means such as the amplifier is supported by the frame and has a connection with an extension of the arbor of motor 29 to dampen movement of the arbor whereby rotation of the arbor will be in direct response to the energization of the servomotor.

The gear connection between the servomotor and shaft 19 is provided by a pinion 36 keyed to the arbor of the servomotor and meshing with a gear 37 keyed to shaft 38. Shaft 38 is journaled in the base portion of frame 16 and a bracket 39 carried by upright support 18. The connection between shaft 38 and shaft 19 preferably includes an antibacklash mechanism.

A novel anti-backlash gear system has been developed for this purpose. This system comprises gear members 40 and 41 having peripheral gear surfaces. The gears are each rigidly interconnected to the rotatable shaft of the follow-up arm or shaft 19. Gear 40 meshes with worm gear 42 rigidly carried by shaft 38 and serves to rotate the follow-up system in one direction. Rotation of the shaft 19 in the other direction is effected by another gear arrangement including gear 41 inter-connected with worm gear 43 at the end of shaft 38 through gears 44, 45 and 46. Gears 45 and 46 are inter-connected for rotation at the same rate on a shaft secured to frame 18. Gear 45 meshes with worm gear 43. Gear 44 is held in meshing engagement with gears 46 and 41 by its shaft secured to frame 18. This arrangement eliminates the backlash encountered in conventional worm gear arrangements because the rotation of shaft 19 is effected in one direction by one gear system and in the other direction by the other gear system.

The ratio of the gear system just described connecting the arbor of servomotor 29 with shaft 19 is such that the angular disposition of shaft 19 will be the same as the angular disposition or variation between the pendulum 15 and the frame 16. It will be seen that the arrangement of the pendulum and follow-up system is such that the follow-up support or shaft 19 is rotated substantially in unison with pendulum 15 relative to the instrument case or frame 16. Thus there has been an elimination of any detention that would be otherwise encountered by either the friction in the bearing or the torsion of the wire, whichever is used to provide the mounting for the pendulum.

Obviously the pendulum in this condition would be free to move and would enter into an oscillation in accordance with its period. This oscillation is retarded to considerable extent by the selection of the particular pendulum in the form of an unsymmetrical disk and which has a long period. However, it is necessary to further dampen the tendency for oscillation. This may be accomplished by imposing a magnetic flux about the rim of the pendulum. A suitable permanent magnet 47 may be secured to the frame and it is desirable to also provide electromagnet 113 supported by the follow-up as shown secured to compensator 48 to be next described. These magnets have their poles about the rim of the pendulum to provide this flux.

In operation the acceleration or deceleration of the vehicle carrying the apparatus will provide a force which will tend to move the pendulum of the vertical. Inasmuch as the pendulum is utilized for the purpose of providing a vertical reference axis it is obvious that the apparatus to be complete must have a means for compensating for these forces due to acceleration and deceleration of the vehicle. The means for accomplishing this does not constitute a part of this invention, and in the interest of simplicity this compensator is shown schematically only at 48 and constitutes a plurality of electromagnets mounted on arm 26 and which are energized by a generator, not shown in the drawings, having an operative connection with a wheel, preferably an undriven wheel, of the carrying vehicle whereby the electrical impulse generated will be a function of the acceleration and deceleration forces of the vehicle. It is to be understood that other suitable acceleration compensators may be used with this apparatus.

*Sine measurer and integrator*

It is believed apparent from the foregoing description that the angular disposition of follow-up shaft 19 represents the angle between the frame of the instrument or the sprung chassis of the vehicle and the horizontal reference axis provided by the pendulum. Due to the necessity of having a spring mounting for the frame 16 on the instrument in order to protect it from the shocks and jolts that would accompany an unsprung mounting, the angular disposition of frame 16 is not necessarily the true angular disposition of the roadway relative to the horizontal. In my co-pending application mentioned above, a mechanism was outlined for introducing into the sine converter a true angle having a correction for the angular variation between the frame and a reference bar extending between the front and rear axles of the vehicle. The angular disposition of the follow-up and the angular disposition between the frame and the reference bar were simultaneously fed into a differential gear arrangement and the resulting true angle between the roadway and the pendulum was then introduced into the sine converter and the integrator. While this arrangement has proven to be satisfactory, it is very difficult to maintain in exact operating order due to the backlash that will almost invariably exist in the differential gear arrangement.

The differential gear could be eliminated by placing the apparatus in a cradle and attaching the cradle to a reference line that will have an invariable relation with the roadway by a mechanism that will transmit angular disposition of the reference line relative to the horizontal but will eliminate all other movement such as lateral movement, up and down movement and the like. Then the frame 16 would, of course, always bear a constant relationship relative to the roadway and the angular disposition of follow-up support 19 relative to the frame would represent the true angle between the roadway and vertical. However, due to the bulk of the machine, this arrangement would be rather cumbersome and the only portion of the device which requires such a parallel relation with the roadway is the slide arm or link 49 of the sine converter and integrator. This may be readily accomplished by mounting the integrator pivotally about support shaft 19.

Referring in more detail to the integrator and its mounting about shaft 19 a housing 50, shown schematically in Fig. 1, is provided for the integrator having an arm 51 rotatably mounted upon shaft 19. A mechanism is provided for maintaining arm 51 in an invariable angular position relative to the roadway. This mechanism will be hereafter more fully described and the details of the integrator will now be referred to.

Figure 3:
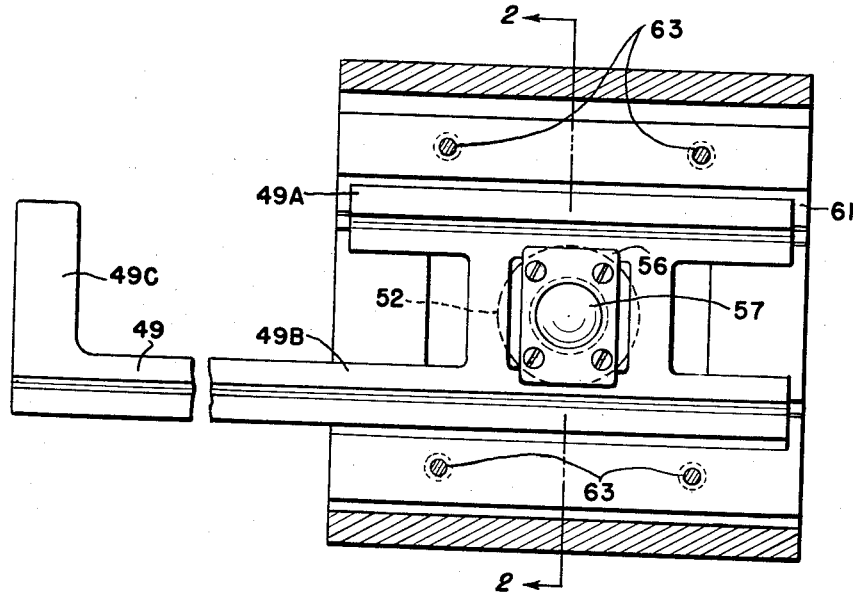
Fig. 3 is a view taken along the line 3—3 in Figs. 1 and 2 of the drawings.
Figure 2:
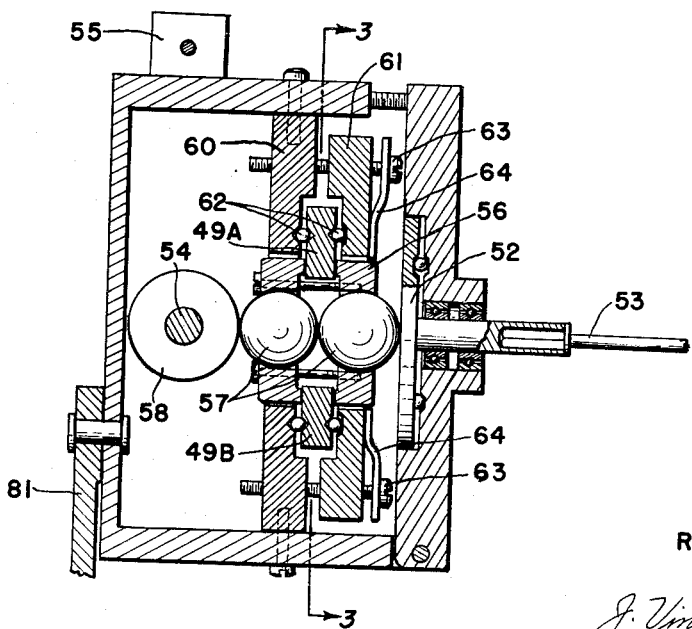
Fig. 2 is a view taken along the line 2—2 in Fig. 1 in the direction of the arrows.

The mechanism of the integrator is best shown in Figs. 2 and 3. The integrator comprises a plate or disk 52 rotatably mounted in the housing upon suitable ball bearings and having a flexible drive connection 53 with a ground engaging wheel. The connection 53 may be of the type used on the usual speedometer or odometer of an automobile. This rotating disk provides a continuous reference of the distance traveled by the vehicle and is connected with the output shaft 54 by a ball and cage and roller connection. Shaft 54 is connected through a gear train to a counter 55. The cage 56 holds balls 57 in tight engagement at their peripheries but permits free rotation of each of the balls. The balls are also positioned intermediate and in engagement with disk 52 and a roller 58. With this arrangement any rotation imparted to the balls 57 engaging plate 52 will be transmitted through the other ball 57 to the roller 58, keyed to shaft 54 to impart rotation to the output shaft. With the ball engaging disk 52 at its center, there will be no rotation imparted to the ball regardless of the rate of rotation of the disk. On the other hand, if the balls are displaced from the center of the disk the balls will rotate and rotate the roller in accordance with the rate of rotation of the disk and the position of the ball which engages the disk relative to the center of he disk.

With this arrangement the counter 55 will record the elevation differential if a means is provided to displace the ball cage so as to provide a contact between one of the balls 57 and disk 52 at a point removed from the disk center, proportional to the sine of the angle between the horizontal and the roadway being traversed. The displacement of the ball cage relative to the center of the disk 52 as a function of the sine of the angle phi, mentioned in the foregoing paragraph, may be provided by mounting the ball cage on slide 49. Slide 49 has a ball bearing connection with housing 50 provided by brackets 60 and 61 which have grooves serving as the race for the bearing balls 62. One of those grooves preferably is V-shaped in cross-section. The other races for the bearings are provided by grooves, V-shaped in cross-section, in opposite sides of portions 49A and 49B of the slide. The slide is free to move axially within the housing 50 of the integrator. The race 60 is secured by screws to the housing 50. The races 60 and 61 are held together by screws 63 threaded to races 60 and passing through leaf spring 64. The heads of the screws abut the springs to provide a resilient connection between the races and assure proper sliding movement of the slide 49.

The end of slide 49 remote from the integrator housing, carries an upturned portion, 49C, adapted to engage a roller 68 carried by an arm 66 which is keyed to shaft 19. A spring clip 67 is attached at one end to roller 65 and at the other end to roller 68. This spring clip arrangement maintains extension 49C of the slide in contact with roller 68. With this arrangement it is seen that rotation of shaft 19 will effect rotation of roller 68 about the shaft and that the movement translated to the slide by rotation of the roller about shaft 19 will be proportional to the sine of the angular disposition of the shaft 19 relative to arm 51.

The sliding movement imparted to slide 49 upon rotation of shaft 19 will then position ball cage 56 relative to disk 52 as a function of the sine of the angular displacement of a follow-up support or shaft 19.

It will be remembered that the mounting of the integrator upon the pivoted arm 51 includes a connection with a reference bar or reference points having a constant position above the roadway. This will transmit the angular movement of the line determined by the reference points to the bar 51. The ball cage and slide 49 will slide relatively thereto as a function of the sine of the angle between the reference bar and the horizontal reference direction established by the pendulum. Thus the ball 57 in contact with disk 52 will have a position, with respect to the center of the disk, dependent upon the sine of the angle between the roadway and the pendulum.

With this arrangement of parts, the only gear train that is employed in the mechanism is the gear train including worm gears 42 and 43 and the gears of the novel antibacklash mechanism including gears 41, 44, and 46 as well as gears 45 and 40. The blacklash mechanism eliminates any error due to backlash in this train of gears, and the instrument with this construction will give very fine results.

*Road inclination transmitting mechanism*

It is necessary to protect the main mechanism of the instrument from the shock, jolt and the like, to which the wheels of the carrying vehicle are subjected in passing over a roadway. Nevertheless, in order to provide reference points having an invariable position relative to the roadway, it is desirable to utilize the ground engaging wheels, either of the vehicle or of auxiliary apparatus to locate two points having a constant distance above the roadway. These two points serve to determine the invariable reference line.

A suitable mechanism must be provided for translating the angular disposition of a line determined by these reference points to a part carried by the sprung chassis or spring mounted frame 16 without transmitting any of the translatory motion such as up and down motion and lateral motion.

In the above mentioned parent co-pending application a parallel arm mechanism is shown for accomplishing this purpose. This mechanism is similar to that employed in a universal drafting machine. While this mechanism has been found to be satisfactory when the mounting of the frame is such as to be co-planar with the reference line, it has not worked out entirely satisfactory when the instrument is upon the sprung chassis of an automobile due to the weaving of the body of the automobile in travel, and to the co-planar characteristics of the mechanism.

An example of mechanism suitable for this purpose where the instrument is mounted on the ordinary vehicle, is shown in Fig. 1. The points utilized for determining the reference line are provided by flat surfaces or parts 69 at the end of a reference bar 70. These flat surfaces are held against the mounting for or axle for supporting the ground wheels of the vehicle adjacent the wheels on one side of the car. Suitable clamping devices 71 may be employed for securing the reference bar in position with the surfaces 69 held closely against the axle.

Figure 9:
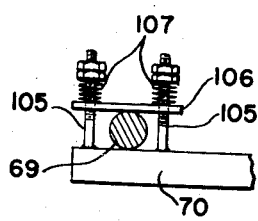
Fig. 9 is a view on an enlarged scale of a preferred clamping arrangement for securing a reference bar to a vehicle axle.
Figure 10:
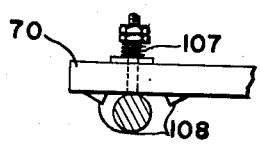
Fig. 10 is a view of the clamping arrangement of Fig. 9 taken from a position 90° from that of Fig. 9.

In Figs. 9 and 10 a preferred clamping arrangement is shown wherein the reference bar is secured to the axle of the vehicle in such manner as to provide for relative rotational, lateral and axial movement between the reference bar and vehicle axle. This may be accomplished by providing the bar with bolts 105 spaced sufficiently apart to provide clearance for lateral displacement of the axles under normal driving stresses. A clamping member 106 is resiliently secured to the bolts by lock nuts and coil springs 107. This arrangement holds the bar snugly against the axle but permits relative movement therebetween. The axle may carry lugs 108 which serve as guides or stops to maintain the bar within selected limits.

The parts or points 69 are connected to a member 72, carried by shaft 73 journalled in support 18, by the mechanism that will impart to the member 72 the angular position of the reference points without transmitting thereto the translatory movements of the reference points. This mechanism includes push rods 74 connected between reference bar 70 and a cross piece 75; ball and socket joints are preferably provided for connecting the ends of the push bars to the reference bar 70 and cross piece 75 to provide for universal movement therebetween. Preferably the connection of at least one of the push rods 74 to the cross piece 75 includes an adjustable connection including a wing nut 76 to secure the rod connection 76A in a slot 75A in the cross piece. This provides a means for adjusting the distance between the connections of rods 74 upon the cross piece. This adjustment is important for the purpose of compensating for the horizontal attitude of frame 16 relative to the reference bar so that distribution of the load carried by the vehicle does not affect the instrument.

Cross piece 75 carries three rollers 77 having grooved peripheries which provide tracks for rods 78 connected to member 72 at one end and carrying a spacer or brace 79 at the other end. With the above arrangement of parts, member 72 will be maintained in a constant angular position relative to bar 70. Nevertheless, the bar 70 may move laterally or up and down or axially with respect to the member 72 and the translatory movement will not be transmitted from the bar to the member 72. In order to introduce this angle to the integrator, shaft 73 may be connected through a parallel linkage to the integrator housing 50 or through any other suitable linkage. It is necessary that the connection be such as to maintain a constant angular disposition between slide bar 49 and the reference points 69. This linkage includes arm 80, rigidly connected at one end to shaft 73 and having its other end pivoted to link 81 which also is pivoted to housing 50.

In Fig. 4, a modified linkage for transmitting the angular disposition of the reference line to the shaft 73 is shown. This modification includes push rods 82 having pivoted connections between reference bar 70 and a bracket 83. The bracket 83 carries a rod 84 in spaced relation therewith. The rod 83 is contacted by rollers 85, having grooved peripheries and mounted upon the horizontal arm of cross piece 86. The vertical arm of cross piece 86 has rollers mounted thereon in the same fashion as rollers 85 mounted on the horizontal arm but on the opposite side of the cross piece, and these rollers are similarly engaged with a rod 87 carried by member 88. The member 88 is rigidly connected with the end of shaft 73. With this arrangement the push rods with their pivoted or hinged connection provide for lateral movement between the reference bar and part 83. The roller mountings of rods 84 and 87, with the cross piece, provide for vertical and horizontal movement between the reference bar and member 88 secured to shaft 73.

Another modified arrangement that is suitable for this purpose is shown in Fig. 5. This arrangement is especially adapted for use where, due to the automobile's chassis construction, a solid reference bar 70 cannot be used.

In this apparatus, instead of a reference bar, a cable is employed. The points having fixed position above the roadway are provided by pulleys 89 fixed to the vehicle's axle. One end of each of the cables 90 and 91 are secured to the axles of the vehicle and the other ends are secured to the cross piece 75. Other pulleys 91A secured to the sprung chassis are employed to guide the cables. The cross piece 75 is urged upwardly to maintain the cables 90 and 91 taut by spring 92 fastened between cross piece 75 and the sprung chassis of the vehicle. In place of member 72, a bar 93 with a pinion gear 93A is employed at the upper ends of rods 78. The pinion gear meshes with gear 94 rigidly connected to shaft 73. The ratio of gears 93A and 94 should be equal to the ratio of distance between the connections 109 of the cables with the cross piece 75 and the distance between points 110 where the cables connect with the axles. It is believed apparent that the operation of this modification is substantially the same as the modification shown in Fig. 1.

The modification of Fig. 5A is adapted to be employed where great accuracy is demanded or all of the vehicle wheels are driven wheels. A bicycle frame 95 is employed to provide auxiliary ground engaging wheels 96 for locating with great accuracy the points having a constant position above the roadway. These points may be considered to be the parts 97 which are associated with the mounting for the ground engaging wheels. The bicycle frame has a hinged parallel arm connection indicated generally at 98 with a member 99. This member 99 is connected by push rods 100 to a member 101 rigidly secured to shaft 73. The push rods 100 are pivoted at their ends, respectively, to the members 99 and 101.

Figure 6:
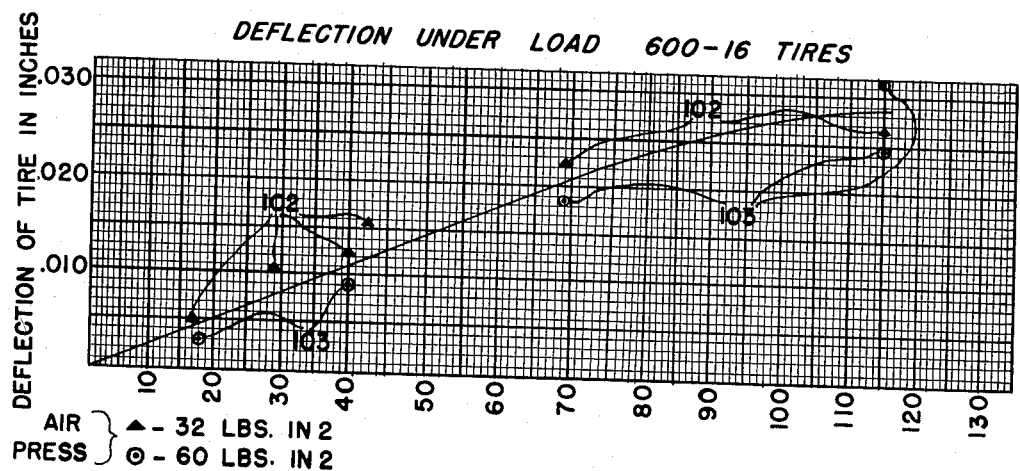
Fig. 6 is a graph illustrating the effect of a shift in load carried by the spring mounted chassis of a vehicle upon the deflection of the tires.

The modifications of Figs. 4, 5 and 6 are shown for the purpose of illustrating a few of the many ways in which the reference points may be connected to the integrator and are shown by way of illustration and not by way of limitation.

Referring to the operation of the instrument the frame 16 is adapted to be mounted upon the sprung chassis of a vehicle such as an automobile. The unsymmetrical disk 15 provides the pendulum and may be mounted upon precision ball pivot bearings or upon torsion wire supports carried by bracket 20 constituting an extension of shaft 19 which provides a follow-up support. The shaft or follow-up support 19 carries a photoelectric system including cells 22 and 23 mounted on one side of the pendulum and the light emitting means 24 with suitable reflectors 25A and 25B for reflecting the light through pendulum 15, which serves as a shutter, to the photo-electric cells. The notches 15B and 15C in the pendulum meter the light that is transmitted to the photocells 22 and 23. When the pendulum and photocells are in a predetermined relative position the electrical impulses generated by the photocells are equal. However, when the frame 16 assumes a new angular position relative to the horizontal coordinate provided by the pendulum, the notches 15B and 15C change their position relative to the photocells and unequal electrical impulses are generated. These impulses are amplified by amplifier 32 and serve to operate the servomotor 29. This motor current is proportional to the angular displacement between the frame 16 and the horizontal coordinate and effects a proportional rotational movement of pinion 36. This rotational movement is transferred through the gear trains, including the anti-blacklash mechanism to the follow-up shaft or support 19. The ratio of this gearing is such that the angular movement of shaft 19 will be the same as the angular movement of the frame 16 relative to the coordinate system. Thus this angular movement is the same as the angular displacement of the frame relative to the horizontal coordinate.

With this follow-up arrangement, the follow-up support moves in substantial unison with the frame 16 and thus any detention of the pendulum due to friction or torsion in the means by which the pendulum is mounted is substantially eliminated.

The angular movement of the follow-up support or shaft 19 may be and in this apparatus is utilized to introduce into the integrator the sine of the angle between the reference bar 70 and the horizontal coordinate. This angle is continuously converted into the sine due to the arrangement of the slide arm 49 having its extension 49C engaging roller 68. It will be understood that the roller 68 will be moved through an arc defined by the angular movement of shaft 19 and that this will impart to slide 49 a linear movement proportional to the sine of the angle multiplied by the radius of roller 68 from the axis of shaft 19. This movement effects the positioning of the ball cage with respect to rotating disc 52 within the integrator.

The roadway inclination reference is provided by positively locating points 69 at a constant distance above the roadway so that the line determined thereby, which in the illustration of Fig. 1 will be the axis of reference bar 70, will be located in an invariable position relative to the roadway. The angular deviations of this reference line are then introduced into the integrator by providing a linkage that will maintain the integrator in a constant position relative to the two points 69.

It is believed apparent that if the integrator housing 50 is rocked upon its pivot while the roller 68 is held in a constant position an axial movement will be imparted to slide 49 effecting the positioning of the ball 67 that contacts plate or disk 52.

With the ball 57 constantly in a position upon disk 52 which is a function of the sine of the angle between the vertical coordinate provided by the pendulum and the reference line, roller 58 will be rotated as a function of the elevation differentials throughout the path traversed by the vehicle. The output shaft 54 is connected through a train of bevelled gears with counter 55 to constantly add or subtract the elevation differences along the route of the vehicle.

In the previous discussion, it has been assumed that the two points 69 located on the mounting for the front and back wheels of a vehicle are a constant distance above the ground surface. Practically, this is not true for the rubber tires are interposed between these points, and variation of the static load on the tires causes the tires to deflect somewhat.

Variation in the tire pressures will also affect the results but it has been experimentally shown that if the tire pressures are kept above 30 pounds per square inch there is little difference in the deflection in the tires due to increased pressure up to 60 pounds per square inch. This is illustrated in the graph of Fig. 6.

As long as the load on the vehicle is distributed equally between the front and rear tires, no error will be introduced into the mechanism. However, if the load is unequally distributed differential deflection will be introduced into the results obtained by the instrument of the order indicated by the graph of Fig. 6. In this figure, the dots on the graph shown at 102 represent the deflection for various loads with the tires inflated at 32 pounds. On the other hand the dots shown at 103 represent the deflection in inches of the tires when the tires are inflated with pressures of 60 pounds.

These differential loads are usually introduced to the wheels through the medium of the body or sprung chassis of the car and a means is provided to correct for this. Thus the error which would be introduced by deflection of the tires can be substantially compensated for and thus eliminated by adjusting the position of connector 76A in slot 75A. By this adjustment the one side of the parallel arm arrangement may be shortened to magnify the compensation between the frame of the instrument and the reference line so as to substantially compensate for tire deflection. This adjustment may be provided for by an adjustable connection between one of the push rods 74 upon reference bar 70.

It is contemplated that where apparatus as shown in Fig. 6 is employed one of the ground wheels 96 may have its axle connected to the flexible coupling 53 of Fig. 1 to control the rotation of disc 52 of the integrator.

From the foregoing, it will be seen that this invention is one well adapted to attain all of the ends and objects herein above set forth, together with other advantages which are obvious and which are inherent to the structure.

It will be understood that certain features and sub-combinations are of utility and may be employed without reference to other features and sub-combinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having described the invention, what is claimed is:

1. In an elevation meter for vehicles, a frame adapted to be resiliently mounted on a vehicle, a follow-up support mounted on said frame for rotation about an axis, a pendulum providing a horizontal reference direction and mounted on the follow-up support and having the axis about which it pivots co-axial with the rotative axis of the follow-up support, means for rotating the follow-up support about its axis to maintain it in predetermined rotative relationship to the pendulum, parts separate from the frame and mountable upon the unsprung chassis of a vehicle for providing a reference line in the path of travel of the vehicle and at a constant position above a roadway, sine measuring means supported by the frame and including a slide arm adapted to move longitudinally along its length in proportion to the sine of the angle between the reference direction and the reference line so that the sine of the angle times the differential of the distance travelled by the vehicle can be continuously integrated to yield the difference in elevation between two points along the path of travel of the vehicle, means connecting said slide arm and said parts including elements maintaining a predetermined angular relationship between the reference line and the slide arm and eliminating transmission of translatory movement therebetween, and means connecting said slide arm to said follow-up support in such a manner that rotation of said follow-up support about its axis relative to said reference line moves said slide arm along its length a distance equal to the sine of the angle through which said follow-up support rotates whereby the angle fed into said sine measuring means is that between said horizontal direction and said reference line irrespective of movement of the frame about the rotative axis of the follow-up support.

2. In an instrument mountable upon a vehicle for determining and indicating differences in elevation between separate points on the earth's surface traversed by the vehicle comprising a follow-up support mounted for rotation about an axis, a pendulum mounted on the follow-up support and having its pivot aligned with the follow-up support axis, said pendulum providing a horizontal reference direction about the support axis, means for rotating the support about its axis to maintain the follow-up support in predetermined rotative position relative to the pendulum including a photo electric system carried by the follow-up support and controlling said means for rotating the follow-up support responsive to the relative position of the follow-up support and pendulum, said pendulum being in the form of an unsymmetrical disk having cut-away portions at its periphery through which the light actuating the photo electric cells of said photo electric system passes when said pendulum is maintained in said predetermined rotative position, but such that rotation of said disk from such position will cause a portion of the light to fall on said disk instead of said cells whereby there is provided a shutter for the photo electric system.

RAYMOND T. CLOUD.

References Cited in the file of this patent

UNITED STATES PATENTS

| Number | Name | Date |
|---|---|---|
| 330,391 | Gifford | Nov. 17, 1885 |
| 1,100,698 | Stoddard | June 16, 1914 |
| 1,109,667 | Dikeman | Sept. 8, 1914 |
| 1,533,723 | Brown | Apr. 14, 1925 |
| 1,843,959 | Sperry | Feb. 9, 1932 |
| 1,988,458 | Minorsky | Jan. 22, 1935 |
| 2,080,511 | Sjostrand | May 18, 1937 |
| 2,113,436 | Williams | Apr. 5, 1938 |
| 2,118,105 | Perry | May 24, 1938 |
| 2,261,945 | Abel | Nov. 11, 1941 |
| 2,302,575 | Romaine et al. | Nov. 17, 1942 |
| 2,362,616 | Cloud | Nov. 14, 1944 |
| 2,366,346 | Malone | Jan. 2, 1945 |

FOREIGN PATENTS

| Number | Country | Date |
|---|---|---|
| 284,505 | Great Britain | Feb. 2, 1928 |
| 381,202 | Great Britain | Sept. 26, 1932 |